United States Patent [19]

Gibson et al.

[11] Patent Number: 4,929,713

[45] Date of Patent: May 29, 1990

[54] PREPARATION OF OPEN CHAIN POLY(REISSERT COMPOUNDS)

[75] Inventors: Harry W. Gibson; Yajnanarayana H. R. Jois, both of Blacksburg, Va.

[73] Assignee: Virginia Polytechnic Institute and State University, Blacksburg, Va.

[21] Appl. No.: 418,312

[22] Filed: Oct. 6, 1989

[51] Int. Cl.$^5$ .............................................. C08G 2/00
[52] U.S. Cl. ................................... 528/230; 528/232; 528/242; 528/243; 528/247; 528/269
[58] Field of Search ............... 528/230, 232, 242, 243, 528/247, 269

[56] References Cited

PUBLICATIONS

McEwen et al, "Synthetic Uses of Open-Chain Analogues of Reissert Compounds", J. Org. Chem., 1980, 45, 1301–1308.
CA105(3):24162s, "Reissert Compound Studies, LIII A New Synthesis of Reissert Compounds Using Tri-n-Butyltin Cyanide".
CA104(23):207221j, "Reissert Compound Studies.L. Nature of Reissert Analogs Derived from . . . ".
CA87:202161k, "Polycyanamides Based on Bis(x--aminonitrides): Synthesis and Isomerization Cyclization".

*Primary Examiner*—John Kight, III
*Assistant Examiner*—S. A. Acquah
*Attorney, Agent, or Firm*—Richard P. Fennelly; Louis A. Morris

[57] ABSTRACT

An open chain poly Reissert can be formed by the initial reaction of an aromatic dialdehyde (e.g., terephthaldicaboxaldehyde) and primary amine (e.g., methylamine) to form a reaction product which is then reacted with an aliphatic acid chloride (e.g., adipoyl chloride).

8 Claims, No Drawings

PREPARATION OF OPEN CHAIN POLY(REISSERT COMPOUNDS)

BACKGROUND OF THE INVENTION

Recently, it has been proposed that Reissert compounds be synthesized to develop novel heterocyclic polymers for high performance applications (see H. W. Gibson et al., Amer. Chem. Soc., Polymer Preprints, 29(1), 154, 1988). Bis (Reissert compounds) have been synthesized in excellent yields by the use of a trimethylsilyl cyanide reagent and can be used to develop such polymers (see A. Pandya et al., Amer. Chem. Soc., Polymer Preprints, 30(1), 206, 1989). Several novel 4,4'-coupled bis-isoquinolines have also been synthesized (see H. W. Gibson et al., Amer. Chem. Soc., Polymer Preprints, 30(1), 208, 1989).

W. E. McEwen et al., in J. Org. Chem. 1980, 45, 1301–1308 discuss the synthetic uses of open-chain analogues of Reissert compounds by first preparing an aminonitrile by condensation of a primary amine with a cyanohydrin followed by reaction of the aminonitrile with an acid chloride to form the Reissert compound.

Chemical Abstracts, Vol. 87, 202161k reports on work by N. Voznesenskaya et al. in 1977 relating to the preparation of poly(phenyleneimidazolones) by polymerization of bis(alpha-aminonitriles) with aromatic dicarboxylic acid chlorides and subsequent cyclization of the prepared poly(alpha-cyanamides) by isomerization. The instant process has a number of differences over the process shown by Voznesenskaya et al: (1) the presence of aliphatic dialdehyde-derived alpha-aminonitriles; (2) the use of aliphatic diacid chlorides; and (3) the production of chemically modifiable copolymers, e.g., by copolymerization with polyester and polyamide precursors.

DESCRIPTION OF THE INVENTION

The instant invention relates to the formation of an open chain poly Reissert product of the reaction product of an aromatic dialdehyde, a primary amine, and an aliphatic diacid chloride by: (a) the reaction of an aromatic dialdehyde, e.g., terephthaldicaboxaldehyde, with a primary amine, e.g., methylamine, in the presence of cyanide and bisulfite to yield a reaction product thereof; and (b) the reaction of the reaction product from (a) with an aliphatic diacid chloride to yield the open chain poly Reissert product thereof.

The initial reaction of the instant process involves the reaction of an aromatic dialdehyde (e.g., terephthaldicaboxaldehyde) of the formula H(O)C—Ar—C(O)H where Ar is phenyl with a primary amine $RNH_2$, where R is alkyl, e.g., methyl, in the presence of a cyanide source (e.g., an alkali metal cyanide) and a bisulfite source (e.g., an alkali metal bisulfite). The reaction can be conducted at temperatures of from about −25° to 100° C., preferably 0° C. to about 25° C. preferably using a molar ratio of dialdehyde to amine of from about 1:2 to about 1:2.5. The amount of cyanide and bisulfite, respectively, can preferably range from about 1 to about 1.5 moles and from about 1 to about 1.5 moles, respectively. The resulting reaction product has the formula

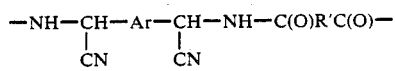

is then used in the following step.

The reaction product described above is then reacted with an aliphatic diacid chloride of the formula ClC(O)R'C(O)Cl where R' is alkylene (e.g., a $C_4$–$C_6$ alkylene group) to yield the desired open chain poly Reissert compound having the following repeating group:

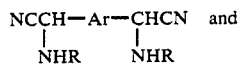

where Ar is phenyl and R' are as defined above. This reaction step can be conducted at room temperature in a suitable organic solvent (e.g., dimethylformamide) and base to remove by-product hydrochloric acid.

The instant invention is further understood by the Examples which follow.

EXAMPLE 1

A mixture of water (600 ml) and sodium bisulfite (0.6 mole, 62.4 gm) in a two liter beaker equipped with a mechanical stirrer was stirred until solution was complete. Terephthaldicaboxaldehyde (0.3 mole, 40.24 gm) was added, and the mixture was stirred for one hour. Methylamine (0.6 mole, 20.2 gm, 50.5 ml of a 40% solution) was added and was further diluted by the addition of water (100 ml). This was followed by the addition of sodium cyanide (0.6 mole, 29.4 gm) over a thirty minute period. The reaction mixture was stirred overnight and the precipitate produced was filtered, washed with water and dried. Purified product was obtained by treatment once with activated carbon (NORIT brand) and crystallization from ethyl acetate. The crude yield of alpha, alpha'-dicyano-alpha, alpha'-bis (N-methylamino)-p-xylene was 40 gm (63%). It had a melting point of 130.5°–131.5° C.

IR (KBr): 3345–3200 (m, NH), 3000–2800 (m, aliphatic and aromatic C—H), 2224 (CN), 1484, 1462, 1447, 1425, 1412, and 1300 cm$^{-1}$.

$^1$H NMR (CDCl$_3$) delta 7.59 (s, 4H, Ar-H), 4.8 (s, 2H CHCN), 2.58 (s, 6H, CH$_3$).

IH NMR (DMSO-d$_6$) 7.53 (s, 4H, Ar-H), 5.07–4.99 (m, 2H, CHCN), 3.15–3.0 (m, 2H, NH), 2.34 and 2.32 (two singlets, 6H, CH$_3$).

Analysis: Theory: C 67.21%; H 6.59%; and N 26.15, Found: C 67.21%; H 6.62%; and N 26.12%.

EXAMPLE 2

To a well stirring solution of the compound from Example 1 (0.01 mole, 2.143 gm) and base (0.02 mole), e.g., pyridine or triethylamine, in N,N-dimethylformamide (7 ml) at 20°–25° C. under nitrogen atmosphere was added adipoyl chloride (0.01 mole, 1.83 gm) in 3 ml N,N-dimethylformamide. Stirring was continued at room temperature for four days. The reaction mixture was quenched by pouring into one liter of water and the resulting mixture was stirred for five hours. Solids were filtered and treated with one liter of water and one liter of ethanol and dried. The yield of open chain poly Reissert compound of the previously described structure (with Ar being phenyl and R' being $(CH_2)_4$) was 2.92 gm.

IR (KBr): 2950–2900 (C-H), 1667–1642 (broad peak, N-CO),
1513 (aromatic), 1476, 1467, 1461, 1450, 1415, 1391, 1343, 1279, 1271 and 1108 $cm^{-1}$.

$^1$H NMR (DMSO-$d_6$) delta 7.46 (s, 4H, Ar-H), 6.98 (s, 2H, CHCN), 2.91 (s, 6H, $CH_3$), 2.50 (s, 4H, $CO_2$—$CH_2$), and 1.60 (fs, 4H, $CH_2CH_2$).

We claim:

1. A process for the formation of the open chain poly Reissert product of the reaction product of an aromatic dialdehyde, a primary amine and an aliphatic diacid chloride which comprises:
   (a) reaction of an aromatic dialdehyde with a primary amine in the presence of cyanide and bisulfite to yield a reaction product thereof; and
   (b) reaction of the reaction product with an aliphatic diacid chloride to yield the open chain poly Reissert product thereof.

2. A process as claimed in claim 1 wherein the aromatic dialdehyde is terephthaldicaboxaldehyde.

3. A process as claimed in claim 1 wherein the primary amine is methylamine.

4. A process as claimed in claim 1 wherein the aliphatic diacid chloride is adipoyl chloride.

5. A process as claimed in claim 1 wherein the dialdehyde is terephthaldicaboxaldehyde, the primary amine is methylamine, and the diacid chloride is adipoyl chloride.

6. An open chain poly Reissert having the repeating unit

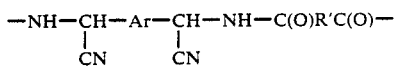

where Ar is phenyl and R' is alkylene.

7. A poly Reissert as claimed in claim 6 wherein R' is $C_4$-$C_6$ alkylene.

8. A poly Reissert as claimed in claim 6 wherein R' is derived from adipoyl chloride.

* * * * *